April 9, 1963 L. OLBRICH 3,084,508
GAS TURBINE PROPULSION POWER PLANT CONSTRUCTION
Filed Jan. 12, 1960
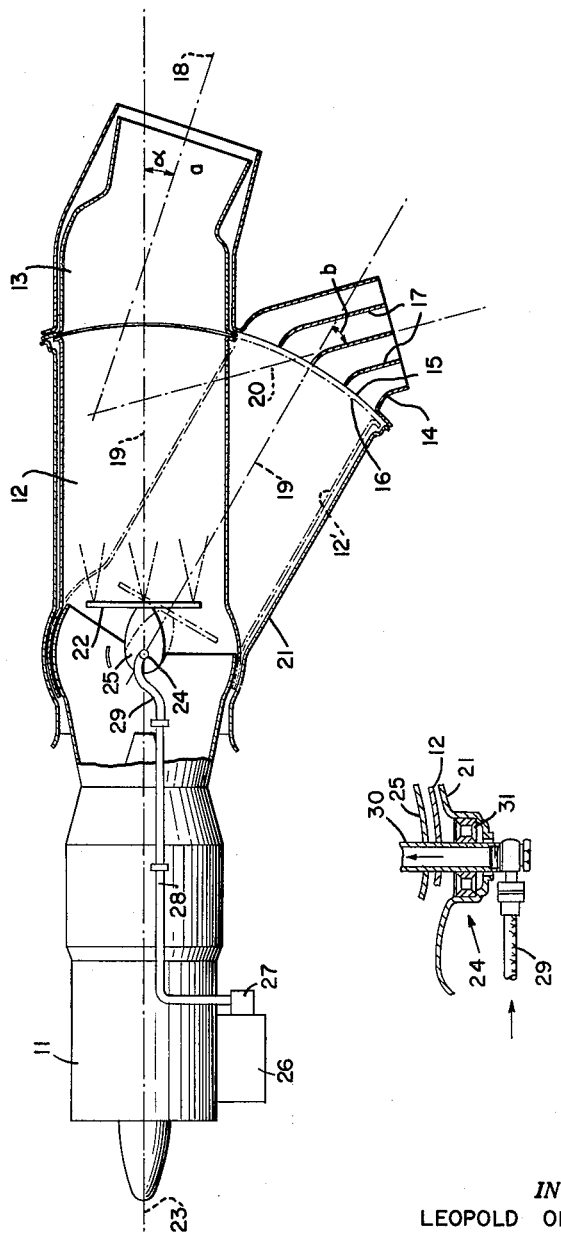
INVENTOR.
LEOPOLD OLBRICH
BY
*Dicke, Craig & Freudenberg*
ATTORNEYS United States Patent Office 3,084,508
Patented Apr. 9, 1963

3,084,508
GAS TURBINE PROPULSION POWER PLANT
CONSTRUCTION
Leopold Olbrich, Stuttgart-Bad, Cannstatt, Germany, assignor to Daimler-Benz Aktiengesellschaft, Stuttgart-Unterturkheim, Germany
Filed Jan. 12, 1960, Ser. No. 2,568
Claims priority, application Germany Jan. 17, 1959
8 Claims. (Cl. 60—35.54)

The present invention relates to a gas turbine propulsion unit provided with an afterburner and thrust nozzle, particularly such a propulsion unit which may be installed in a vertical take-off or short distance take-off airplane in which the afterburner is pivotally arranged to enable changing from normal flight conditions to take-off or landing conditions. More particularly, the present invention relates to an improvement for a gas turbine propulsion plant and airplane equipped therewith of the type disclosed in the copending application Serial No. 810,106, filed April 30, 1959, in the name of Kurt Reiniger, entitled "Gas Turbine Propulsion Plant and Airplane Equipped Therewith" and assigned to the assignee of the present invention, the subject matter of which is incorporated herein by reference insofar as necessary.

The aim of aiding the airplane during starting and landing operations is pursued by deflecting the driving gas jet in that the thrust or a component of the thrust of the driving gas jet is directed in opposition to the effect of the gravitational force. Special requirements demand of airplanes under certain conditions that they are capable to take off and land essentially vertically.

By pivotally arranging the afterburner at the drive unit as proposed in the aformentioned copending application, the deflection of the driving gas jet is displaced into a zone in which controllable conditions still exist from a technological and flow point of view, that is, the deflection of the driving gas jet leaving the turbine takes place still in front of the fuel injection arrangement disposed at the inlet of the afterburner. Consequently, with the application of a drive unit having such a construction as driving power for an airplane, especially of the type mentioned hereinabove, the thrust output of the afterburner does not have to be given up which is of particular signficance during take-off of the airplane.

In contradistinction to the aforementioned copending application, in which the thrust nozzle rigidly connected with the afterburner is pivotal together with the same, it is proposed in accordance with the present invention to separate the thrust nozzle from the pivotal afterburner, to arrange the thrust nozzle to be relatively stationary, and to construct the same in such a manner that it encompasses the entire pivotal range of the afterburner.

According to a further feature of the present invention, it is proposed to constitute the thrust nozzle of two individual nozzles, namely, of a thrust nozzle which is preferably designed for supersonic operation and which constitutes during normal flight conditions with retracted afterburner the continuation of the afterburner arranged essentially coaxially with the axis of the drive unit, and of a further thrust nozzle designed as subsonic nozzle the inlet aperture of which completely coincides with the discharge aperture of the afterburner in the completely swung-out end thereof.

The present invention provides optimum discharge conditions and therewith optimum propulsion efficiency for normal flights which takes place mostly in the supersonic range as well as for climbing and descending flights of the airplane since separate thrust nozzles are provided constructed to correspond to the expected discharge velocities and discharge quantities of the gases in the jet which vary considerably in the two operating ranges.

Furthermore, the subdivision of the thrust nozzle into two individual nozzles provides the possibility to select different angles of adjustment for the two thrust nozzles in relation to the two end positions of the afterburner in such a manner that the fixed angle of adjustment of the subsonic nozzle with respect to the afterburner in the fully swung-out position thereof is kept larger than the fixed angle of adjustment of the supersonic nozzle with respect to the afterburner in the normal position thereof which entails advantages for both flying conditions, namely, the climbing and descending flights, on the one hand, and the normal level flights, on the other, since the pivot range of the afterburner may be kept relatively smaller. A smaller pivot angle of the afterburner thereby reduces the end face or surface of the airplane cell or nacelle and therewith the air resistance or air-drag of the airplane.

Accordingly, it is an object of the present invention to provide a gas turbine propulsion unit for airplanes, especially vertical take-off airplanes or short distance take-off airplanes which adapts the discharge velocities and quantities of the thrust-producing gases in a most favorable manner to the different operating requirements existing under these two flight conditions.

Still another object of the present invention resides in the provision of two separate thrust nozzles for use with a pivotally arranged afterburner which effectively reduces the air-drag of the airplane.

It is another object of the present invention to provide a gas turbine propulsion unit for airplanes which permits the use of separate thrust nozzles for supersonic and subsonic flights of the aircraft.

These and further objects, features and advantages of the present invention will become more obvious from the following description when taken in connection with the accompanying drawing wherein FIGURE 1 is a side elevational view of the overall gas turbine propulsion unit provided with a pivotal afterburner, with parts thereof broken-away for clarity's sake, and FIGURE 2 is a partial cross-sectional view through the bearing means at one side of the pivotal afterburner.

Referring now more particularly to the drawing, reference numeral 11 designates therein the gas producing unit which consists of a gas turbine of conventional construction including compressor, combustion chambers and turbine rotor.

The afterburner 12 is pivotally arranged at the rear end of the gas producer 11. The position of the afterburner 12, shown in full lines in the drawing, indicates the position thereof during normal level flights which are usually supersonic flights. The thrust nozzle 13, constructed as a supersonic nozzle, adjoins the afterburner 12 in the directional flow of the thrust-producing gases. A subsonic nozzle 14 is disposed below the supersonic nozzle 13 the inlet aperture 15 of which completely coincides with the outlet aperture 16 of the afterburner position 12' which is the completely swung-out end position of the afterburner 12 when pivoted into the position illustrated in the dot and dash line in the drawing. In the various intermediate positions of the afterburner 12, both thrust nozzles 13 and 14 are simultaneously supplied more or less with a respective partial propulsion gas quantity derived from the gas-producing unit.

The subsonic nozzle 14 is also subdivided by transversely extending metallic guide members 17 into individual zones or chambers in order to adapt the outlet or discharge cross-section thereof to the different partial gas quantities supplied thereto in the different positions of the afterburner 12 whereby a favorable thrust efficiency is achieved always.

The longitudinal axis 18 of the supersonic nozzle 13 and the longitudinal axis 19 of the afterburner 12 which may or may not coincide with the main longitudinal axis 23 of the overall drive unit, subtend therebetween an angle $\alpha$ which is smaller than the angle $b$ subtended between the longitudinal axis 20 of the subsonic nozzle 14 and the longitudinal axis 19' of the afterburner 12' when the latter is pivoted to the completely swung-out position.

The afterburner 12 pivots within a housing 21 rigidly secured with the drive unit or cell of the airplane which serves also for purposes of guiding cooling air and as seal against the outside.

Reference numeral 22 designates the fuel injection installation for the afterburner 12 or 12' which may be of any suitable known construction.

The supply of fuel to the fuel injection installation 22 may take place in an advantageous manner through the pivot bearing generally designated reference numeral 24 of the afterburner 12 which is constructed in a hollow manner whereby the pivot bearing 24 is simultaneously cooled by the flow therethrough of the fuel. Fuel may be supplied by means of a fuel pump 26, a suitable metering device 27, a rigid conduit 28 connected at one end of metering device 27 and at the other end to a flexible conduit 29. Conduit 29 is in turn connected to a hollow bearing axle 30 extending through bearing means 24 and a supporting casing 25, and leading to the fuel injection installation 22. Bearing means 24 further include bearings 31 surrounding axle 30.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. A gas propulsion unit for vertical take-off or short distance take-off airplanes, comprising gas-producing means having a longitudinal axis, a relatively fixed housing connected to said gas-producing means and including supersonic nozzle means having an inlet portion substantially aligned with the longitudinal axis of said gas-producing means and downwardly directed subsonic nozzle means, afterburner means pivotably mounted within said housing and including an essentially annular conduit and fuel injection means positioned within said conduit, and pivot means to pivotally mount said afterburner means upon a relatively fixed part of said housing to enable pivotable movement from a first position in operative relationship with said supersonic nozzle means for producing a thrust primarily in the forward direction during normal flight conditions into a swung out position in operative relationship with said subsonic nozzle means for producing a thrust aiding the take-off and landing of the airplane.

2. A gas propulsion unit for vertical take-off or short distance take-off airplanes, comprising gas-producing means having a longitudinal axis, relatively fixed housing means connected to said gas-producing means and including relatively fixed supersonic nozzle means and relatively fixed subsonic nozzle means spaced from said supersonic nozzle means, afterburner means mounted within said housing means and including conduit means and fuel injection means within said conduit means, and means to pivotably mount said afterburner within said housing means to enable movement from a retracted position in operative relationship with said supersonic nozzle means for producing a thrust primarily in the forward direction during normal flight conditions to a swung out position in operative relationship with said subsonic nozzle means for producing a thrust having a major component aiding the take-off and landing of the airplane.

3. A gas propulsion unit for vertical take-off or short distance take-off airplanes, comprising gas-producing means having a longitudinal axis, an essentially annular, relatively fixed housing means operatively connected to said gas-producing means and including a relatively fixed supersonic nozzle and a relatively fixed downwardly directed subsonic nozzle adjacent said supersonic nozzle means, afterburner means including conduit means and fuel injection means mounted within said conduit means, and pivot axis means upstream of said fuel injection means to pivotally mount said afterburner means within said housing means to enable movement from a retracted position in operative relationship with said supersonic nozzle means for producing a thrust primarily in the forward direction during normal flight conditions to a swung out position in operative relationship with said subsonic nozzle means for producing a thrust having a major component aiding the take-off and landing of the airpline.

4. A gas propulsion unit according to claim 2, wherein both of said nozzle means are disposed directly one above the other in a substantially vertical plane and are each supplied with a partial thrust-producing gas quantity with said afterburner means in an intermediate position between the two end positions thereof.

5. A gas propulsion unit according to claim 2, wherein during normal flight with said afterburner means completely retracted, the axis of the latter is essentially an extension of the longitudinal main axis of said propulsion unit.

6. A gas propulsion unit according to claim 1, wherein the longitudinal axis of said subsonic nozzle and the longitudinal axis of said afterburner means in a completely swung-out position thereof form an angle therebetween in such a manner that the longitudinal axis of said subsonic nozzle extends obliquely with respect to the longitudinal axis of said afterburner means.

7. A gas propulsion unit according to claim 2 wherein said pivot means include rotatable bearing means for said afterburner means to enable pivotal movements thereof, said bearing means being constructed in a hollow manner, and said gas propulsion unit further comprising fuel injection means for said afterburner means including fuel supply means through said hollow bearing means for conducting therethrough the fuel whereby the flow of fuel through said hollow bearing means cools said hollow bearing means.

8. A gas propulsion unit for airplanes, comprising gas-producing means, afterburner means including a conduit having an open end connected to one end of said gas-producing means and fuel supply means within said conduit, pivot means pivotally mounting said conduit with respect to said gas-producing means, housing means enclosing said afterburner means and including a relatively fixed normal flight nozzle and a downwardly directed relatively fixed take-off assist nozzle below said normal flight nozzle following said afterburner means in the flow sequence of the gases from said gas-producing means, said afterburner means being pivotable from a position in alignment with said normal flight nozzle for selectively producing a thrust in the forward direction during normal flight conditions of said unit to a swung out position in alignment with said take-off assist nozzle for producing a thrust having a component aiding the take-off and landing of the airplane, said nozzle means being constructed so as to encompass the entire pivot range of said afterburner means to enable a continuously variable adjustment of said afterburner means relatively to said nozzles whereby the amount of thrust producing gases supplied to a respective one of said nozzles may be varied, and said take-off assist nozzle including guide means for subdividing the same into a plurality of zones sequentially spaced into communication with said afterburner means during pivoting movements thereof.

References Cited in the file of this patent

UNITED STATES PATENTS

| | | |
|---|---|---|
| 2,774,554 | Ashwood et al. | Dec. 18, 1956 |
| 2,857,740 | Hall et al. | Oct. 28, 1958 |
| 2,968,149 | Graham et al. | Jan. 17, 1961 |
| 2,973,921 | Price | Mar. 7, 1961 |
| 2,986,877 | Emmons et al. | June 6, 1961 |

FOREIGN PATENTS

| | | |
|---|---|---|
| 1,035,487 | Germany | July 31, 1958 |
| 1,049,711 | Germany | Jan. 29, 1959 |
| 723,160 | Great Britain | Feb. 2, 1955 |